United States Patent [19]

Juen et al.

[11] Patent Number: 6,075,087

[45] Date of Patent: Jun. 13, 2000

[54] RESIN-FILLERS PRODUCED IN-SITU IN SILICONE POLYMER COMPOSITIONS METHOD FOR PREPARATION OF THE COMPOSITIONS

[75] Inventors: Donnie Ray Juen, Sanford; Bianxiao Zhong, Midland, both of Mich.

[73] Assignee: Dow Corning Corporation, Midland, Mich.

[21] Appl. No.: 09/224,415

[22] Filed: Dec. 31, 1998

[51] Int. Cl.$^7$ ..................................................... C08L 83/04
[52] U.S. Cl. .......................... 524/588; 524/858; 525/474; 525/477; 525/478
[58] Field of Search ..................................... 524/588, 837, 524/858; 525/474, 477, 478

[56] References Cited

U.S. PATENT DOCUMENTS

| | | |
|---|---|---|
| 2,676,182 | 4/1954 | Daudt et al. . |
| 2,814,601 | 11/1957 | Currie et al. . |
| 2,857,356 | 10/1958 | Goodwin . |
| 3,445,420 | 5/1969 | Kookootsedes et al. . |
| 3,528,940 | 9/1970 | Modic . |
| 3,627,851 | 12/1971 | Brady . |
| 4,611,042 | 9/1986 | Rivers-Ferrell et al. . |
| 4,639,489 | 1/1987 | Aizawa et al. . |
| 4,707,531 | 11/1987 | Shirahata . |
| 4,774,310 | 9/1988 | Butler . |
| 4,831,070 | 5/1989 | McInally et al. . |
| 4,865,920 | 9/1989 | Sweet et al. . |
| 5,034,061 | 7/1991 | Maguire et al. . |
| 5,082,590 | 1/1992 | Araud ...................................... 252/321 |
| 5,096,981 | 3/1992 | Traver . |
| 5,470,923 | 11/1995 | Krahnke et al. . |
| 5,527,873 | 6/1996 | Kobayashi et al. . |
| 5,693,256 | 12/1997 | Sawicki et al. .......................... 252/321 |
| 5,914,362 | 6/1999 | Brecht et al. ............................ 524/268 |

*Primary Examiner*—Robert Dawson
*Assistant Examiner*—Jeffrey B. Robertson
*Attorney, Agent, or Firm*—Timothy J. Troy

[57] ABSTRACT

This invention relates to resin-fillers and compositions containing the resin-fillers. Resin-fillers are the reaction product of a resin having monofunctional siloxane (M) units and tetrafunctional siloxane (Q) units, chemically linked to a crosslinker by addition reaction. The resin-fillers have properties more similar to those of silica fillers and less like those of conventional MQ resins. The resin-fillers are insoluble in solvents, form homogeneous blends with silicone polymers, and dramatically impact modulus and viscosity of a polymer even at low (e.g. 5 to 10 wt %) loading.

11 Claims, 1 Drawing Sheet

RESIN-FILLERS PRODUCED IN-SITU IN SILICONE POLYMER COMPOSITIONS METHOD FOR PREPARATION OF THE COMPOSITIONS

FIELD OF THE INVENTION

This invention relates to resin-fillers formed in-situ in compositions. More particularly, this invention relates to a resin-filler formed in-situ in a silicone polymer composition.

BACKGROUND OF THE INVENTION

The siloxane resins of the present invention are frequently designated "MQ" resins. MQ resins are macromolecular polymers consisting essentially of $R_3SiO_{1/2}$ and $SiO_{4/2}$ units (the M and Q units, respectively) wherein R is a functional or nonfunctional organic group. Those skilled in the art will appreciate that such resins may also include a limited number of $R_2SiO_{2/2}$ and $RSiO_{3/2}$ units, respectively referred to as D and T units. As used herein, the term "MQ resin" means that, on average, no more than about 20 mole percent of the resin molecules are comprised of D and T units.

MQ resins are frequently produced by the acid hydrolysis and subsequent condensation of silicate salts, as disclosed in U.S. Pat. No. 2,676,182, issued to Daudt et al. on Apr. 20, 1954, which is incorporated herein by reference. Such MQ resins are generally produced in such a manner that the resin macromolecules are dissolved in a solvent, which is typically, but not always, an aromatic solvent.

U.S. Pat. No. 2,814,601 issued to Currie et al. on Nov. 26, 1957 discloses that MQ resins can be prepared by converting a water-soluble silicate into a silicic acid monomer or silicic acid oligomer using an acid. When adequate polymerization has been achieved, the resin is end-capped with trimethylchlorosilane to yield the MQ resin.

However, these MQ resins suffer from the drawback that the amount of silanol remaining in the resin after end-capping is large.

U.S. Pat. No. 2,857,356 issued to Goodwin on Oct. 21, 1958 discloses a method for the preparation of an MQ resin by the cohydrolysis of a mixture of an alkyl silicate and a hydrolyzable trialkylsilane organopolysiloxane with water. However, this method suffers from the drawback that large amounts of alkoxy groups and silanol groups remain in the MQ resin, thereby creating the problem of poor storage stability.

U.S. Pat. No. 4,611,042 issued to Rivers-Ferrell et al. on Sep. 9, 1986, which is hereby incorporated by reference, discloses a xylene soluble resinous copolymer containing trimethylsiloxane (M) units, alkenyldimethylsiloxane(M) units, and $Sio_{4/2}$ (Q) units. The ratio of alkenyldimethoxysilaneunits to trimethylsiloxaneunits is 0.02:1 to 0.5:1. The ratio of total M to Q unitsis0.6:1 to 1.2:1.

U.S. Pat. No. 4,707,531 issued to Shirahata on Nov. 17, 1987 discloses a process for preparing an MQ resin by dripping an alkyl silicate into a mixture of aqueous hydrochloric acid and a trialkylsilane or disiloxane at a temperature of 0 to 90° C. This method creates problems from an environmental standpoint because it generates an aqueous hydrochloric acid solution containing large amounts of methanol, and this method is also not capable of preparing high molecular weight Si—H containing MQ resins.

U.S. Pat. No. 4,774,310 issued to Butler on Sep. 27, 1988 discloses an MQ resin containing silicon-bonded hydrogen atoms and a method for its preparation. The method comprises heating a siloxane resin and a disiloxane of formula $(HR_2Si)_2O$ in the presence of an acidic catalyst. The reaction mixture formed by heating the resin and disiloxane is then neutralized.

U.S. Pat. No. 5,527,873 issued to Kobayashi et al. on Jun. 18, 1996 discloses a silicone resin and a method for its preparation. The method comprises mixing (a) a silicone resin, (b) an organic solvent, and (c) an acid catalyst to form a reaction product and subsequently reacting the reaction product with a diorganopolysiloxane.The resulting MQ silicone resin a molecular weight of about 1,000.

Numerous uses have been discovered for MQ resins, including their use as a component in pressure sensitive adhesives, paints, coatings and elastomers. For example, MQ resins can be used in coatings as disclosed in U.S. Pat. No. 3,627,851 to Brady, Dec. 14, 1971, and U.S. Pat. No. 5,034,061 to Maguire et al., Jul. 23, 1991.

MQ resins can also be used in pressure sensitive adhesives as disclosed in U.S. Pat. No. 2,857,356 to Goodwin, Oct. 21, 1958; U.S. Pat. No. 3,528,940 to Modic, Sep. 15, 1970; U.S. Pat. No. 4,831,070 to Mclnally et al., May 16, 1989; U.S. Pat. No. 4,865,920 No. to Sweet et al., Sep. 12, 1989; U.S. Pat. No. 5,470,923 to Krahnke et al., Nov. 28, 1995; and EP 0 459 292 A2.

Previously, the weight average molecular weight (Mw) of MQ resins has been limited to about 30,000 and the number average molecular weight Mn has been lim ited to about 7,000. This limitation is inherent in the above-described preparation via hydrolysis and condensation of silicate salts, as attempts to obtain higher molecular weights generally result in an intractable gel.

A higher molecular weight compound based on MQ resins is described in U.S. Pat. No. 4,639,489 issued to Aizawa et al. on Jan. 27, 1987 discloses the reaction of an MQ resin with a hydroxy-terminated polydimethylsiloxane in the preparation of a defoamer. The weight of linear polydimethylsiloxane is, however, much greater than the amount of MQ resin used in the reaction. Thus, the reaction product does not consist essentially of M and Q siloxy units, but consists predominantly of D siloxy units.

Therefore, one object of this invention is to provide a resin-fillet formed in situ in a silicone composition. Another object of this invention is to provide a process for preparing the resin-filler and a silicone composition containing the resin-filler.

SUMMARY OF THE INVENTION

This invention relates to resin-fillers, which are MQ resins chemically linked with crosslinkers, that have properties more similar to those of silica fillers and less like those of conventional MQ resins. The resin-fillers are insoluble in organic solvents, and form stable suspensions in silicone polymers. The resin-fillers dramatically increase viscosity of a silicone polymer composition even at low (e.g. 5 to 10 wt %) loading. The resin-fillers have median aggregate particle size in the range of 5 to 50 micrometers.

DETAILED DESCRIPTION OF THE INVENTION

Figure 1:
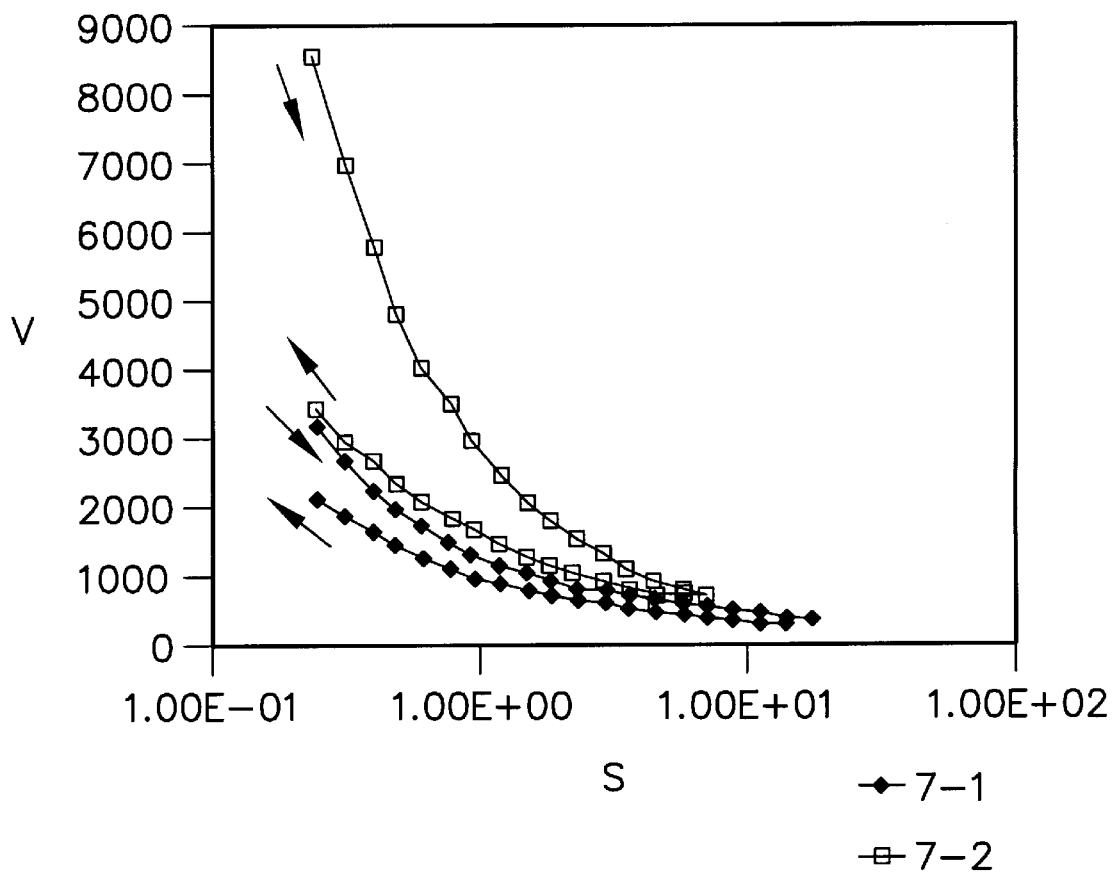
FIG. 1 is a graph showing steady shear rate sweep curves for two polyorganosiloxane compositions containing the resin-filler of this invention.

This invention relates to a resin-filler that can be produced in-situ in silicone polymer compositions. The resin-filler comprises the reaction product of component (A), a vinyl-functional MQ resin, and component (B), a substantially linear polydiorganosiloxane having silicon bonded hydrogen atoms.

Component (A) is a solid vinyl-functional MQ resin having the average general unit formula

wherein: $R^1$ is a hydroxyl group, $R^2$ is a monovalent hydrocarbon group having at least one unsaturated bond between at least two adjacent carbon atoms (i.e., vinyl) that is capable of addition reaction with a silicon-bonded hydrogen atom; each $R^3$ is an alkyl, aryl or arylalkyl group, wherein the $R^3$ groups may be the same or different, a is a number from 0 to 0.2, b is number from 0.02 to 1.50, and c is a number from 0 to 1.48, with the proviso that $1 \leq a+b+c \leq 1.5$. $R^2$ is preferably a vinyl group. $R^3$ is preferably a methyl group.

If a+b+c is less than 1, component (A) cannot be dissolved in a diluent. If a+b+c is greater than 1.5, then component (A) will not be a solid, but rather a viscous liquid. If b is less than 0.02, then the resin-filler may not be an insoluble solid after the volatile diluent is removed therefrom, or the resin-filler may not dramatically increase the viscosity of the nonvolatile diluent in which the resin-filler is dispersed. Preferably, a is 0.03 to 0.1, b is 0.04 to 0.1, c is 1.18 to 1.33, and the quantity a+b+c is 1.25 to 1.45.

Component (B) is a substantially linear polydiorganosiloxane of the empirical formula:

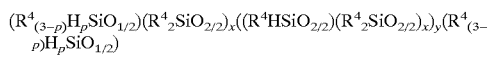

wherein each $R^4$ is a monovalent group independently selected from the group consisting of alkyl, aryl, and arylalkyl groups, p is 0 or 1, x ranges from 0 to 70, and y ranges from 0 to 100, with the proviso that at least two silicon-bonded hydrogen atoms are present in each molecule. $R^4$ is preferably methyl; p is preferably 0; x is preferably 0 to 1, and y is preferably 6 to 15.

The resin-fillers are advantageous over conventional silica fillers because the resin-fillers circumvent issues of difficult filler dispersion into silicone polymers. Conventional silica fillers are solids in the form of large aggregates which are often difficult to disperse in silicone polymer compositions as small aggregates or particles. However, components (A) and (B) of this invention are both soluble in solvents and silicone polymers. The resin-fillers with a desired range of aggregate sizes can be made by reacting (A) and (B) in a controlled fashion.

This invention further relates to a method for preparing the resin-filler in-situ in a diluent. The method comprises heating a reaction mixture comprising components (A) and (B) described above in the presence of component (C), a catalyst; and component (D), a diluent. Components (A), (B), and (C) are dissolved in component (D). Component (E), an optional catalyst inhibitor, may also be added to the reaction mixture.

Components (A) and (B) are typically reacted in a weight ratio of (A):(B) equal to 1.4:1 to 22:1. Preferably, (A):(B) is 2.6:1 to 9.0:1, and more preferably 2.6:1 to 6.7:1. However, the exact ratio used depends the number of Si—H groups of each molecule of component (B) and the degree of polymerization of component (B). The amounts of components (A) and (B) are selected such that the reaction product thereof is insoluble in solvents. Preferably, the amounts of components (A) and (B) are selected such that the reaction product thereof increases the viscosity of a silicone polymer composition by at least 1,000% when 10 weight % of the reaction product is present in the composition.

The applicants believe that the following guidelines will allow one skilled in the art to select an appropriate (A):(B) ratio without undue experimentation. In general, for a given MQ resin for component (A) and a given linker for component (B), as the amount of component (B) increases, the degree of copolymerization between (A) and (B) increases to a maximum, and thereafter decreases as the amount of component (B) continues to increaise. Correspondingly, the viscosity of a silicone polymer diluent containing a resin-filler increases as the amount of component (B) increases to the maximum, and thereafter viscosity decreases as the amount of component (B) continues to increase. It is thought that when excess (A) is present and primary particles begin to form, the particles begin to aggregate as the amount of (B) increases relative to the amount of component (A) until a maximum aggregate particle size is reached. When the amount of component (B) continues to increase after the maximum size is reached, excess component (B) begins to endcap component (A) instead of linking 2 molecules of component (A) together. This causes aggregate particle size to decrease.

If the amount of component (A) is too high (e.g., (A):(B) is >2:1), then the resin-filler may be soluble in solvents, or it may not increase the viscosity of the polymer dramatically, or both. If the amount of component (B) is too high (e.g., (A):(B) is <1.4:1), then the resin-filler may not be brittle, it may be soluble in solvents, or it may not increase the viscosity of the polymer dramatically, or combinations thereof.

For a given MQ resin for component (A) and a given linker containing two Si—H functionality on the ends, as the degree of polymerization of component (B) ($DP_{(B)}$) decreases not smaller than 5 however), the degree of the copolymerization reaction increases, and the reaction product will become less soluble in volatile liquids or the viscosity of a silicone polymer composition comprising the copolymerized reaction product of (A) and (B) will increase.

Components (A) and (B) are reacted by addition reaction. When the diluent (D) is a polymer, the components (A) and (B) are dispersed in (D) by stirring or shear mixing. After the catalyst (C) and optionally an inhibitor (F) are dispersed into the mixture by stirring or shear mixing, the composition is typically heated to a temperature of 20 to 200° C., preferably 100 to 120° C. for 1 to 4 hours to carry out the addition reaction. If the reaction is carried out at a temperature higher than 200° C., the polymer may decompose. A catalyst, component (C), is required to promote the reaction.

Component (C) is an addition reaction catalyst, preferably a platinum catalyst. Suitable addition reaction catalysts are described in U.S. Pat. No. 3,419,593 to Willing, Dec. 31, 1968, which is hereby incorporated by reference for the purpose of describing suitable catalysts. Component (C) is exemplified by chloroplatinic acid, alcohol solutions of chloroplatinic acid, complexes of platinum compounds with unsaturated organic compounds such as olefins, and complexes of platinum compounds with organosiloxanes containing unsaturated hydrocarbon groups, where these complexes of platinum with organosiloxanes can be embedded in organosiloxane resins. Component (C) is preferably a complex of platinum with an organosiloxane. Component (C) is most preferably is a complex of platinum with 1,3-diethenyl-1,1,3,3-tetramethyldisiloxane or such complex embedded in an organosiloxane resin with methyl and phenyl functional groups. Component (C) is typically added in an amount such that the reaction mixture contains 0.2 to 40 ppm by weight of platinum, preferably 1 to 10 ppm.

Components (A), (B), and (C) are dissolved in component (D), at diluent selected from the group consisting of volatile and nonvolatile liquids, to form the reaction mixture. The volatile liquid can be an organic solvent or a low viscosity polyorganosiloxane. Examples of suitable organic solvents include alkanes such as hexane and heptane; aromatic solvents such as toluene, xylene, and benzene; and ketones. Low viscosity polyorganosiloxanes typically have viscosity less than 100 mPa·s and are exemplified by octamethylcyclotetrasiloxane and decamethylcyclopentasiloxane. When component (D) is a volatile liquid, it can be removed from the reaction mixture after components (A) and (B) have reacted. The resulting resin-filler will be insoluble in solvents after the volatile liquid has been removed from the reaection mixture.

Alternatively, component (D) can be a nonvolatile liquid, such as a nonvolatile silicone polymer, exemplified by high viscosity polydiorganosiloxanes. High molecular weight polydiorganosiloxanes typically have viscosity in the range of greater than 100 mPa·s to 10 million mPa·s or higher; but preferably, viscosity is in the range of 1,000 to 30,003 mPa·s. The high molecular weight polydiorganosiloxane may have a linear or branched structure. When component (D) is a nonvolatile liquid, the MQ resin component (A) can be either added as a neat powder or a solution in polymer (D), and the resin-filler will be dispersed therein after the reaction of components (A) and (B).

Component (E), an optional inhibitor, can also be added to the reaction mixture. Component (E) can be any addition reaction catalyst inhibitor. Suitable inhibitors are disclosed in U.S. Pat. No. 3,445,420 to Kookootsedes et al., May 20, 1969, which is hereby incorporated by reference for the purpose of describing catalyst inhibitors. Component (E) can be an amine such as trialkylamine, an oxime, a peroxide such as hydrogen peroxide, or an acetylenic compound such as dialkylacetylene, dicarboxylates, and acetylenic alcohols such as methylbutynol or ethynyl cyclohexanol. Component (E) is preferably ethynyl cyclohexaiiol. Component (E) comprises 0 to 0.05 weight percent of the composition.

The resin-filler imparts significant shear thinning and thixotropic properties to silicone polymer compositions in which the resin-filler is dispersed. The resin-fillers are advantageous because they are hydrophobic. Conventional silica fillers are hydrophilic. However, hydrophilic fillers are undesirable for some applications. Therefore, typically silica fillers were treated to render them hydrophobic. However, typical treated fillers do not impart significant shear thinning or thixotropic behavior to compositions containing the treated fillers. The resin-fillers of the present invention are hydrophobic and impart shear thinning or thixotropic properties, or both, to silicone polymer compositions in which the resin-fillers are dispersed.

This invention further relates to a method for controlling the viscosity of the silicone polymer composition having the resin-filler dispersed therein. Viscosity can be increased by increasing the amount of a given resin-filler in the diluent, increasing the degree of copolymerization between (A) and (B) by varying the ratio of (A):(B), or both. Viscosity can be ecreased by decreasing the amount of a given resin-filler in the diluent, decreasing the degree of copolymerization between (A) and (B) by varying the ratio of (A):(B), or both.

This invention further relates to a method of adjusting the aggregate particle size of the resin-fillers. The method comprises (i) varying the degree of copolymerization between (A) and (B) by varying the ratio of (A):(B) or by varying the degree of polymerization or the number of Si—H functionalities of each component (B) molecule, (ii) varying the loading of resin-filler in the diluent, or both. The aggregate particle size is typically 5 to 50 micrometers.

For example, when the loading of resin-filler in the diluent is fixed at 5 weight %, and component (B) has a degree of polymerization of 12 and 8 Si—H groups, when (A):(B) is 32:1, primary particles begin to form based on observations with a optical microscope at 1000×magnification. The primary particles typically have a diameter of about 1 micrometer. As the amount of (B) increases relative to the amount of component (A), aggregate particles begin to form. The aggregate particles reach a maximum size when (A):(B) is 5.6:1. It is thought that when the (A):(B) ratio is >32:1, there are not enough molecules of (B) lo link all the molecules of (A). However, the inventors believe that when (A):(B) is <5.6:1, excess (B) molecules begin to endcap molecules of (A) instead of linking to other molecules of (A); thereby decreasing aggregate particle size, as discussed previously.

EXAMPLES

These examples are intended to illustrate the invention to those skilled in the art and should not be interpreted as limiting the scope of the invention set forth in the claims.

In the Examples of the invention and the Comparative Examples below, all parts are weight 'Me' represents a methyl group. 'Vi' represents a vinyl group. 'PDMS' means polydimethylsiloxane. 'Insoluble' means that when a resin filler is made in a volatile diluent, the sample could not be re-dissolved in a solvent such as xylene or polydimethylsiloxane after the sample was prepared and the diluent was removed therefrom. All parts are parts by weight unless otherwise indicated.

Reference Example 1

A solution of 63 parts of component (A), vinyl-functional MQ resin having formula $(Me_3SiO_{1/2})_{0.39}(Me_2ViSiO_{1/2})_{0.06}(OH)_{0.06}(SiO_{4/2})_{0.55}$, and 37 parts of component (D), xylene, was prepared. The vinyl-functional MQ resin had a vinyl content of 2.3 wt %.

Component (B), a dimethyl-methylhydrogensiloxane; component (C), a complex of platinum with 1,3-diethenyl-1,1,3,3-tetramethyldisiloxane; and additional (D) were combined with the composition of vinyl-functional MQ resin and xylene in amounts such that the resulting mixture had desired ratios of (A):(B) and ((A)+(B))/((A)+(B)+(D)). This mixture was heated at 120° C. for one hour. The resulting compositionwas a homogenous blend of resin-fillerproduced in-situ and xylene.

Reference Example 2

A solution of 63 parts of component (A), a vinyl-functional MQ resin having formula $(Me_3SiO_{1/2})_{0.39}(Me_2ViSiO_{1/2})_{0.06}(OH)_{0.06}(SiO_{4/2})_{0.55}$ and 37 parts xylene was mixed with component (D), a polyorganosiloxane diluent. The vinyl-functional MQ resin had a vinyl content of 2.3 wt %. The xylene was stripped out of the mixture under vacuum with gentle heating. The resulting composition had 50 weight parts vinyl-functional MQ resin and 50 parts polyorganosiloxane.

Component (B), a methylhydrogensiloxane;component (C) a complex of platinum with 1,3-diethenyl-1,1,3,3-tetramethyldisiloxane,and additional (D) were mixed with the composition of vinyl-functional MQ resin and polyorganosiloxane in amounts such that the resulting mixture had desired ratios of (A):(B) and ((A)+(B))/((A)+(B)+(D)). In cases of high viscosity, the mixture is mixed under high shear conditions. This mixture was then heated at 120° C. for one hour. The resulting composition was a homogenous blend of in-situ produced filler and polyorganosiloxane.

Reference Example 3

A solution of 63 parts component (A), a vinyl-functional MQ resin having formula $(Me_3SiO_{1/2})_{0.39}(Me_2ViSiO_{1/2})_{0.06}(OH)_{0.06}(SiO_{4/2})_{0.55}$ and 37 parts xylene was mixed with component (D1) a polyorganosiloxane diluent. The vinyl-functional MQ resin had a vinyl content of 2.3 wt %. The xylene was stripped out of the mixture under vacuum with gentle heating. The resulting composition had 50 weight parts vinyl-functional MQ resin and 50 parts polyorganosiloxane.

Component (B), a methylhydrogensiloxane; component (C), a complex of platinum with 1,3-diethenyl-1,1,3,3-tetramethyldisiloxane; and component (D2), a second polyorganosiloxane diluent were mixed with the compositions of vinyl-functional MQ resin and polyorganosiloxane in amounts such that the resulting mixture had desired ratios of (A):(B) and ((A)+(B))/((A)+(B)+(D)). The mixture is mixed under high shear conditions and then heated at 120° C. for one hour. The resulting composition was a homogenous blend of in-situ produced filler ad polyorganosiloxane.

Example 1

Samples 1-1 and 1-2 were prepared according to the method described in Reference Example 1. The ratio of the amounts of (A) the vinyl-functional MQ resin and (B) the methylhydrogensiloxane,(A):(B) in each sample are shown in Table 1. The formula of (B) is also shown in Table 1. The amounts of additional (D), xylene, were selected such that they produced an amount of resin-filler in the sample composition with (D) in Table 1. Whether the resin-filler formed from each sample is insoluble in xylene is also shown in Table 1.

Comparative Example 1

Samples C1-3 and C1-4 were made as in Example 1. The results are shown in Table 1. However, in sample C1-3, the (A):(B) ratio was larger than 22: 1, and in sample C1-4, component (B) had a larger degree of polymerization.

Example 1 and Comparative Example 1 show the range for the (A):(B) ratio. Example 1 also shows that the resin-filler can be prepared in a solvent.

TABLE 1

Contents of Samples Prepared in Xylene and Solubility of the Samples

| Sample # | wt % Resin-Filler | (B) Methylhydrogensiloxane | (A):(B) | Insoluble |
|---|---|---|---|---|
| 1-1 | 10 | $Me(SiMe_2O)_4(SiHMeO)_8SiMe_3$ | 65:35 = 1.9:1 | yes |
| 1-2 | 10 | $Me(SiMe_2O)_4(SiHMeO)_8SiMe_3$ | 95.7:4.3 = 22:1 | yes |
| C1-3 | 10 | $Me(SiMe_2O)_4(SiHMeO)_8SiMe_3$ | 97:3 = 32:1 | no |
| C1-4 | 10 | $Me(SiMe_2O)_7(SiHMeO)_7SiMe_3$ | 95:5 = 19:1 | no |

Example 2

Samples 2-1 and 2-2 were prepared according to the method described in Reference Example 2. The ratio of the amounts of (A) the vinyl-functional MQ resin and (B) the methylhydrogensiloxane,(A):(B), in each sample are shorn in Table 2. The formula of (B) is also shown in Table 2. The amounts of additional (D), the diluent, were selected such that they produced an amount of resin-filler in the sample composition with (D) in Table 2. Whether the resin-filler formed from each sample is soluble in xylene is also shown in Table 2. (D), the diluent, was decamethylcyclopentasiloxane having viscosity of approximately 4 mPa·s. The results are shown in Table 2.

Example 2 shows that the resin-filler can be prepared in a low viscosity siloxane diluent.

TABLE 2

Differing Amounts of Resin-Fillers Prepared in a Composition with a Cyclic Siloxane Diluent

| Sample # | % Resin-Filler | (B) Methylhydrogensiloxane | (A):(B) | Insoluble? |
|---|---|---|---|---|
| 2-1 | 18 | $Me(SiMe_2O)_4(SiHMeO)_8$—$SiMe_3$ | 73.5:26.5 = 2.8:1 | yes |
| 2-2 | 10 | $Me(SiMe_2O)_4(SiHMeO)_8$—$SiMe_3$ | 73.5:26.5 = 2.8:1 | yes |

Example 3

Sample 3-1 and 3-2 were prepared according to the method described in Reference Example 3. The first diluent (D1) is a linear trimethylsiloxy-endblocked, polydimethylsiloxane having a viscosity of 1,000 mPa·s. The second diluent (D2) in samples 3-1 and 3-2 was a branched polydimethylsiloxane having a viscosity of 17,000 mPa·s made by using the process described in U.S. Pat. No. 4,639,4 89 to Aizawa et al. on Jan. 27, 1987. Viscosity was measured at room temperature (25+/−2° C.). A Brookfield® cone/plate digital viscometer with a #52 spindle.

The second diluent (D2), amount of resin-filler formed in ihe diluents, the structure of (B), the (A):(B) ratio, and viscosity are reported in Table 3.

Example 3 shows that the resin-filler can be made in a composition with a branched silicone polymer, and that a higher weight percentage of resin filler in the composition yields higher viscosity.

TABLE 3

Effect of Using a Branched Diluent

| Sample # | Second diluent (D2) | % Resin-Filler | (B) Methylhydrogen-siloxane random copolymer | (A):(B) | Viscosity (mPa·s) |
|---|---|---|---|---|---|
| 3-1 | Branched PDMS (17000 mPa·s) | 8 | $Me(SiMe_2O)_4$—$(SiHMeO)_8SiMe_3$ | 73.5:26.5 = 2.8:1 | 156,000 |
| 3-2 | Branched PDMS (17000 mPa·s) | 5 | $Me(SiMe_2O)_4$—$(SiHMeO)_8SiMe_3$ | 73.5:26.5 = 2.8:1 | 95,000 |

Example 4

Samples in Example 4 and Comparative Example 4 were prepared according to the method described in Reference Example 2. (D), the diluent, was linear trimethylsiloxy-endblocked, polydimethylsiloxane.The diluent, amount of resin-filler formed in the diluent, the formula of (B) the methylhydrogensiloxane, and the ratio of (i):(B) are shown in Table 4. The viscosity of the composition containing the diluent and resin-filler results are also reported in Table 4. Viscosity was measured at room temperature (25+/2° C.). A Brookfield® cone/plate digital viscometer with a #52 spindle was used. The median aggregate particle sizes were measured with a Coulter Laser Scattering Particle Size Analyzer, and results are reported in micrometers. All samples for particle size measurements were diluted with toluene to obtain suitable obscuration and pure toluene was used as reference.

Example 4 and Comparative Example 4 show that when the (A):(B) ratio changes because the amount of component (B) is increasing, the viscosity of the silicone polymer composition increases to a maximum first, and thereafter decreases. The resin-filler aggregate particle size increased and decreased correspondingly.

Example 5

Samples in Example 5 were prepared by the method of reference example 2. The amounts of (A), (B), and (D) were chosen such that samples had varying amounts of resin-filler. The diluent (D) is a linear trimethylsiloxy-endblocked, polydimethylsiloxane. Viscosity results were obtained as in Example 3. The diluent (D), amount of resin-filler formed in the diluent, the structure of (B) the (A):(B) ratio, and viscosity are reported in Table 5.

Example 5 shows that as the amount of resin-filler in the diluent increases, the viscosity of the composition increases.

TABLE 4

Samples Showing Viscosity and Aggregate Particle Size Increases after Preparing Resin-Fillerin-Situ

| Sample # | Diluent | % Resin-Filler | (B) Methylhydrogensiloxane | (A):(B) | Viscosity (mPa · s) | Median aggregate particle size |
|---|---|---|---|---|---|---|
| C4-1 | PDMS (12,500 mPa · s) | 5 | Me(SiMe$_2$O)$_4$(SiHMe$_2$O)$_8$SiMe$_3$ | 97:3 = 32:1 | 11300 | too small to measure |
| 4-2 | PDMS (12,500 mPa · s) | 5 | Me(SiMe$_2$O)$_4$(SiHMe$_2$O)$_8$SiMe$_3$ | 93.5:6.5 =14:1 | 15300 | 5.5 |
| 4-3 | PDMS (12,500 mPa · s) | 5 | Me(SiMe$_2$O)$_4$(SiHMe$_2$O)$_8$SiMe$_3$ | 90:10 = 9:1 | 19100 | 11.5 |
| 4-4 | PDMS (12,500 mPa · s) | 5 | Me(SiMe$_2$O)$_4$(SiHMe$_2$O)$_8$SiMe$_3$ | 85:15 = 5.7:1 | 22700 | 26.6 |
| 4-5 | PDMS (12,500 mPa · s) | 5 | Me(SiMe$_2$O)$_4$(SiHMe$_2$O)$_8$SiMe$_3$ | 80:20 = 4:1 | 18700 | 13.2 |
| 4-6 | PDMS (12,500 mPa · s) | 5 | Me(SiMe$_2$O)$_4$(SiHMe$_2$O)$_8$SiMe$_3$ | 75:25 = 3:1 | 15000 | 5.4 |
| 4-7 | PDMS(12,500 mPa · s) | 5 | Me(SiMe$_2$O)$_4$(SiHMe$_2$O)$_8$SiMe$_3$ | 70:30 = 2.3:1 | 13500 | 3.0 |
| 4-8 | PDMS (12,500 mPa · s) | 5 | Me(SiMe$_2$O)$_4$(SiHMe$_2$O)$_8$SiMe$_3$ | 60:40 = 1.5:1 | 13000 | 1.7 |

| Sample # | Diluent | % Resin-Filler | (B) Methylhydrogensiloxane | (A):(B) | Viscosity (mPa · s) | Median aggregate particle size (microns) |
|---|---|---|---|---|---|---|
| C4-9 | PDMS (1000 mPa · s) | 10 | Me(SiMe$_2$O)$_4$(SiHMe$_2$O)$_8$SiMe$_3$ | 100:0 | 990 | not measured |
| C4-10 | PDMS (1000 mPa · s) | 10 | Me(SiMe$_2$O)$_4$(SiHMe$_2$O)$_8$SiMe$_3$ | 97:3 = 32:1 | 1290 | not measured |
| 4-11 | PDMS (1000 mPa · s) | 10 | Me(SiMe$_2$O)$_4$(SiHMe$_2$O)$_8$SiMe$_3$ | 95:5 = 19:1 | 3380 | not measured |
| 4-12 | PDMS (1000 mPa · s) | 10 | Me(SiMe$_2$O)$_4$(SiHMe$_2$O)$_8$SiMe$_3$ | 90:10 = 9:1 | 219000 | not measured |
| 4-13 | PDMS (1000 mPa · s) | 10 | Me(SiMe$_2$O)$_4$(SiHMe$_2$O)$_8$SiMe$_3$ | 85:15 = 5.7:1 | 417000 | not measured |
| 4-14 | PDMS (1000 mPa · s) | 10 | Me(SiMe$_2$O)$_4$(SiHMe$_2$O)$_8$SiMe$_3$ | 80:20 = 4:1 | 200000 | not measured |
| 4-15 | PDMS (1000 mPa · s) | 10 | Me(SiMe$_2$O)$_4$(SiHMe$_2$O)$_8$SiMe$_3$ | 75:25 = 3:1 | 72700 | not measured |
| 4-16 | PDMS (1000 mPa · s) | 10 | Me(SiMe$_2$O)$_4$(SiHMe$_2$O)$_8$SiMe$_3$ | 72:28 = 2.6:1 | 12600 | not measured |
| 4-17 | PDMS (1000 mPa · s) | 10 | Me(SiMe$_2$O)$_4$(SiHMe$_2$O)$_8$SiMe$_3$ | 65:35 = 1.9:1 | 6920 | not measured |
| 4-18 | PDMS (1000 mPa · s) | 10 | Me(SiMe$_2$O)$_4$(SiHMe$_2$O)$_8$SiMe$_3$ | 60:40 = 1.5:1 | 2281 | notmeasured |

TABLE 5

Effect of Different Amounts of Resin-Filler in Polydimethylsiloxane Diluent

| Sample # | Diluent | % Resin-Filler | (B) Methylhydrogen-siloxane | (A):(B) | Viscosity (mPa · s) |
|---|---|---|---|---|---|
| 5-1 | PDMS (100 mPa · s) | 40 | $Me(SiMe_2O)_4(SiHMeO)_8SiMe_3$ | 73.5:26.5 = 2.8:1 | too high to measure (powder) |
| 5-2 | PDMS (100 mPa · s) | 30 | $Me(SiMe_2O)_4(SiHMeO)_8SiMe_3$ | 73.5:26.5 = 2.8:1 | too high to measure (powder) |
| 5-3 | PDMS (100 mPa · s) | 20 | $Me(SiMe_2O)_4(SiHMeO)_8SiMe_3$ | 73.5:26.5 = 2.8:1 | too high to measure (powder) |
| 5-4 | PDMS (100 mPa · s) | 10 | $Me(SiMe_2O)_4(SiHMeO)_8SiMe_3$ | 73.5:26.5 = 2.8:1 | 7860 |
| 5-5 | PDMS (100 mPa · s) | 5 | $Me(SiMe_2O)_4(SiHMeO)_8SiMe_3$ | 73.5:26.5 = 2.8:1 | 252 |
| 5-6 | PDMS (1000 mPa · s) | 5 | $Me(SiMe_2O)_4(SiHMeO)_8SiMe_3$ | 73.5:26.5 = 2.8:1 | 1800 |
| 5-7 | PDMS (1000 mPa · s) | 8.6 | $Me(SiMe_2O)_4(SiHMeO)_8SiMe_3$ | 73.5:26.5 = 2.8:1 | 5500 |
| 5-8 | PDMS (1000 mPa · s) | 13 | $Me(SiMe_2O)_4(SiHMeO)_8SiMe_3$ | 73.5:26.5 = 2.8:1 | 112000 |

Example 6

Samples 6-1 and 6-2 were prepared by the method of reference example 2, except that component (B) was a dimethyl-hydrogensiloxy-endblocked dimethyl, methylhydrogen siloxane. The diluent (D) was linear PDMS.

Example 6 shows that as the degree of polymerization of bi-functional component (B) increases, the viscosity of the composition decreases.

TABLE 6

Effects of Degree of Polymerization of Component (B) on Viscosity

| Sample # | Diluent | % Resin-Filler | (B) Methylhydrogen-siloxane | (A):(B) | Viscosity (mPa · s) |
|---|---|---|---|---|---|
| 6-1 | 1000 mPa · s PDMS | 10 | $H(SiMe_2O)_6SiMe_2H$ | 80:20 = 4:1 | 37,270 |
| 6-2 | 1000 mPa · s PDMS | 10 | $H(SiMe_2O)_{68}SiMe_2H$ | 80:20 = 4:1 | 2,837 |

Example 7

Two samples were prepared by the method of reference example 2. Sample 7-1 contained 10 wt % resin-filler, and the diluent was 1,000 mPa·s linear polydimethylsiloxane. Sample 7-2 contained 8 wt % resin-filler, and the diluent was 12,500 mPa·s linear polydimethylsiloxane.

FIG. 1 shows steady shear rate sweep curves for samples 7-1 and 7-2. 'V' represents the viscosity of the sample in units of Pa·s. S represents the steady shear rate in units of 1/s. The measurements were done on a Rheometric Scientific RDA II rheometer equipped with a transducer having a torque range of 0.20 to 200 g cm. A 50-mm Cone and Plate fixture with Cone angle of 0.0403 radians was used. The gap between the upper and lower fixtures was 0.0508 mm. The test temperature was 25 deg. C. The measurement time was 30 seconds and the delay before measurement was 45 seconds.

Example 7 shows that polymer blends containing the in-situ produced resin filler displayed strong shear-thinning and thixotropic properties. As shown in FIG. 1, the steady-shear-rate viscosity of both samples, 7-1 and 7-2, decreases quickly when the shear rate is increased. When the steady shear rate is swept down, the viscosity partially recovered, indicating both shear thinning and thixotropic behaviors. It can also be seen that the length of the linear polymer impacts the thixotropic behavior of a blend greatly and shear-thinning behavior to a much less extent.

We claim:

1. A resin-filter comprising the reaction product of:
   (A) a vinyl-functional MQ resin having average general unit formula

   $$R^1_a R^2_b R^3_c SiO_{(4-a-b-c)/2}$$

wherein: $R^1$ is a hydroxyl group, $R^2$ is a monovalent hydrocarbon group having at least one unsaturated bond between at least two adjacent carbon atoms that is capable of addition reaction with a silicon-bonded hydrogen atom; each $R^3$ is independently selected from the group consisting of alkyl, aryl, and arylalkyl groups, a is a number from 0 to 0.2, b is a number from 0.02 to 1.50, and c is a number from 0 to 1.48, with the proviso that $1 \leq a+b+c \leq 1.5$; and (B) a substantially linear polydiorganosiloxane of empirical formula:

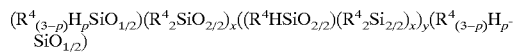
   $$(R^4_{(3-p)}H_pSiO_{1/2})(R^4_2SiO_{2/2})_x((R^4HSiO_{2/2})(R^4_2Si_{2/2})_x)_y(R^4_{(3-p)}H_p\text{-}SiO_{1/2})$$

wherein each $R^4$ is a monovalent group independently selected from the group consisting of alkyl, aryl, and arylalkyl groups, p is 0 or 1, x ranges from 0 to 70, and y ranges from 0 to 100, with the proviso that at least two silicon-bonded hydrogen atoms are present in each molecule; and with the proviso that components (A) and (B) are present in amounts selected such that the reaction product thereof is insoluble in solvents.

2. The resin-filler of claim 1, wherein components (A) and (B) are present in amounts that provide a weight ratio (A):(B) in the range of 1.4:1 to 22:1.

3. The resin-filler of claim 2, wherein the ratio (A):(B) is 2.6:1 to 9.0:1.

4. The resin-filler of claim 1, wherein a is 0.03 to 0.1, b is 0.04 to 0.1, c is 1.18 to 1.33, $R^2$ is a vinyl group and $R^3$ is a meth group.

5. The resin-filler of claim 1, wherein p is 0, x is 0 to 1, y is 6 to 15, and $R^4$ is a methyl group.

6. A method of making a resin-filler, wherein the method comprises heating a reaction mixture comprising:
   (A) a vinyl-functional MQ resin having average general unit formula

wherein: $R^1$ is a hydroxyl group, $R^2$ is a monovalent hydrocarbon group having at least one unsaturated bond between at least two adjacent carbon atoms that is capable of addition reaction with a silicon-bonded hydrogen atom; each $R^3$ is independently selected from the group consisting of alkyl, aryhl and arylalkyl groups, a is a number from 0 to 0.2, b is number at least 0.02 to 1.50, and c is a number from 0 to 1.48, with the proviso that $1 \leq a+b+c<1.5$;

(B) a substantially linear polydiorganosiloxane of empirical formula:

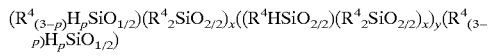

wherein each $R^4$ is a monovalent group independently selected from the group consisting of alkyl, aryl, and aryalkyl groups, p is 0 or 1, x ranges from 0 to 70, and y ranges from 0 to 100, with the proviso that at least two silicon-bonded hydrogen atoms are present in each molecule, with the proviso that components (A) and (B) are present in amounts selected such that the reaction product thereof is insoluble in solvents; and (C) an addition reaction catalyst; and (D) a diluent.

7. The method of claim 6, wherein the diluent is selected from the group consisting of organic solvents and low viscosity polyorganosiloxanes.

8. The method of claim 7, further comprising the step of removing the diluent after reaction of components (A) and (B).

9. The method of claim 6, wherein the diluent is a nonvolatile liquid selected from the group consisting of silicone polymers having viscosities in the range of greater than 100 to 10 million mPa·s.

10. a silicone polymer composition prepared by the method of claim 9.

11. The method of claim 6, wherein the reaction mixture further comprises (E) an addition reaction catalyst inhibitor.

* * * * *